(12) United States Patent
Dumont et al.

(10) Patent No.: US 10,793,253 B2
(45) Date of Patent: Oct. 6, 2020

(54) AIRCRAFT WING COMPRISING A MOVABLE FLAP AND A HOUSING FOR ACCOMMODATING FLEXIBLE PIPING

(71) Applicant: SONACA S.A., Gosselies (BE)

(72) Inventors: Nicolas Dumont, Vieux-Conde (FR); Sylvain Penouilh, Ixelles (BE)

(73) Assignee: SONACA S.A., Gosselies (BE)

( * ) Notice: Subject to any disclaimer, the term of this patent is extended or adjusted under 35 U.S.C. 154(b) by 251 days.

(21) Appl. No.: 16/071,983

(22) PCT Filed: Jan. 24, 2017

(86) PCT No.: PCT/EP2017/051361
§ 371 (c)(1),
(2) Date: Jul. 23, 2018

(87) PCT Pub. No.: WO2017/129536
PCT Pub. Date: Aug. 3, 2017

(65) Prior Publication Data
US 2019/0023375 A1    Jan. 24, 2019

(30) Foreign Application Priority Data

Jan. 27, 2016    (BE) .................................. 2016/5069

(51) Int. Cl.
| | | |
|---|---|---|
| *B64C 9/22* | (2006.01) | |
| *B64D 15/12* | (2006.01) | |
| *B64C 13/50* | (2006.01) | |

(52) U.S. Cl.
CPC ................ *B64C 9/22* (2013.01); *B64D 15/12* (2013.01); *B64C 13/506* (2018.01)

(58) Field of Classification Search
CPC .......... B64C 9/22; B64C 13/506; B64D 15/12
See application file for complete search history.

(56) References Cited

U.S. PATENT DOCUMENTS 4,437,631 A * 3/1984 Martens .................... B64C 9/24
                                                            244/210
7,249,735 B2 * 7/2007 Amorosi ................... B64C 9/22
                                                            244/214

(Continued)

FOREIGN PATENT DOCUMENTS

| EP | 0818387 A1 | 1/1998 |
| EP | 2116467 A1 | 11/2009 |

(Continued)

OTHER PUBLICATIONS

International Search Report for International Application No. PCT/EP2017/051361, dated Apr. 24, 2017.

(Continued)

*Primary Examiner* — Justin M Benedik
(74) *Attorney, Agent, or Firm* — Pearne & Gordon LLP (57) ABSTRACT

An aircraft wing comprising a movable flap which is able to move in rotation relative to a fixed central body, flexible piping and a rail for guiding the movable flap and the flexible piping. The flexible piping-runs along the rail and is secured to the rail close to a distal end of the rail. The wing comprises a structure for holding the flexible piping against or close to the guiding rail, which is borne by the fixed central body. The wing also comprises a housing for accommodating the flexible piping. The housing comprises a wall which is shaped such that the flexible piping coils up inside the housing, being pressed against the wall.

16 Claims, 6 Drawing Sheets

(56) References Cited

U.S. PATENT DOCUMENTS

| | | | | |
|---|---|---|---|---|
| 7,677,499 B2* | 3/2010 | Weaver | ............... | B64D 15/12 |
| | | | | 174/69 |
| 8,408,500 B2* | 4/2013 | Crepin | ............... | B64C 9/22 |
| | | | | 244/214 |
| 2006/0038088 A1* | 2/2006 | Dodson | ............... | B64C 9/22 |
| | | | | 244/214 |
| 2014/0166835 A1 | 6/2014 | Pisacreta | | |

FOREIGN PATENT DOCUMENTS

| | | |
|---|---|---|
| EP | 2167381 B1 | 1/2012 |
| EP | 2733064 A1 | 5/2014 |
| GB | 2417937 A | 3/2006 |

OTHER PUBLICATIONS

Written Opinion for International Application No. PCT/EP2017/051361, dated Apr. 24, 2017.
Preliminary Belgian Search Report for Application No. BE 201605069, dated Jan. 27, 2016.

* cited by examiner

AIRCRAFT WING COMPRISING A MOVABLE FLAP AND A HOUSING FOR ACCOMMODATING FLEXIBLE PIPING

CROSS-REFERENCE TO RELATED APPLICATIONS

This is a National Stage application of PCT international application PCT/EP2017/051361, filed on Jan. 24, 2017, which claims the priority of Belgian Patent Application No. 2016/5069, filed Jan. 27, 2016, both of which are incorporated herein by reference in their entirety.

TECHNICAL FIELD

The invention relates to aircraft wings. The wing comprises a fixed central body and one or more leading edge movable flaps, each for being rotatably moved relative to the fixed central body.

STATE OF PRIOR ART

On aircrafts, each of both airfoil wings is generally equipped with high-lift movable flaps located at the leading edge and the trailing edge of the wing.

The flaps are extended during the landing and take-off phases in order to increase the low- or medium-speed lift. Besides, in flight and at cruise power, the movable flaps are retracted to limit the aircraft air resistance.

The movement of each flap is made using guide rails, such as those known from document EP 0 818 387. These rails enable each leading edge movable flap to be moved along an arc of circle trajectory relative to the wing fixed central body, between a retracted position in which the flaps snugly fit the fixed body, and an extended position in which these flaps are moved forwardly.

At least one of the movable flaps is electrically supplied by cables which extend from the fixed central body. These cables are for example carried by a chain, known from document EP 2 167 381, which is extended between a retracted position, in which the movable flap is retracted, and an unwound position, in which the flap is extended.

However, the chain has in particular a mass and a bulk which are significant in the proximity of the movable flap.

DISCLOSURE OF THE INVENTION

The invention aims at solving at least partially the problems encountered in the solutions of prior art. In this regard, one object of the invention is an aircraft wing.

The wing comprises a fixed central body, a movable flap located at the periphery of the fixed central body and for being rotatably moved relatively to the fixed central body between a retracted position and an extended position, a flexible piping comprising a first end connected to the fixed central body and a second end connected to the movable flap, and a guide rail for guiding the movable flap and the flexible piping. The rail is configured to move between a retracted position and an extended position, when the movable flap moves from its retracted position to its extended position.

According to the invention, the wing further comprises an accommodating housing for accommodating the flexible piping, and a holding means for holding the flexible piping. The housing comprises a wall shaped such that the flexible piping coils up inside the housing by being pressed against the wall, when the guide rail moves from its extended position to its retracted position.

The holding means is configured to hold the flexible piping against or in the proximity of the rail, the holding means being carried by the fixed central body.

The flexible piping runs along the rail, by being secured to the rail in the proximity of the distal end of the rail at which the rail is attached to the movable flap.

The housing and the holding means advantageously enable the flexible piping to accompany the movement of the flap between its retracted position and its extended position, by running along the rail. The piping is thus mechanically protected by the rail and the housing.

The mass and bulk of the wing in the proximity of the movable flap are reduced because of the absence of chain. The holding means, the housing and the flexible piping are also easy to install in the wing, and the piping is easy to replace.

The invention can optionally include one or more of the following characteristics combined together or not.

Advantageously, the holding means comprises a pusher configured to retain the piping against or in the proximity of the rail, a securement means configured to secure the pusher to the fixed central body, and preferably a return means biasing the pusher towards the guide rail.

According to a particular embodiment, the holding means is closer to the proximal end of the rail, at which it is secured to the fixed body, than its distal end.

According to an advantageous embodiment, the perimeter length of the wall between an inlet of the housing and an outlet of the housing is substantially equal to the length difference of the flexible piping along the guide rail between the retracted position and the extended position of the guide rail.

According to a particular embodiment, the housing comprises an inlet and/or an outlet shaped so as to guide the flexible piping such that the piping comes in the housing and/or comes out the housing, along at least one predetermined direction.

Advantageously, the inlet/outlet of the housing comprises a deflector configured to deflect the flexible piping along a predetermined direction.

According to an advantageous embodiment, the housing extends along a longitudinal direction which is tilted relative to the longitudinal direction of the guide rail.

According to another advantageous embodiment, the housing extends along a longitudinal direction which is substantially parallel to the longitudinal direction of the guide rail.

According to another advantageous embodiment, the housing is made and/or positioned so as to avoid water build-up, in order not to block and damage the piping in case of freezing.

Advantageously, the wing comprises a second accommodating housing for accommodating a second flexible piping, the second housing comprising a wall shaped such that the second flexible piping coils up inside the housing by being pressed against the wall, when the guide rail moves from its extended position to its retracted position.

According to a particular embodiment, both flexible pipings extend along two opposite sides of the guide rail, the accommodating housings being each located at one of the opposite sides of the guide rail.

Advantageously, each flexible piping comprises several cables and/or pipes fastened together.

According to a particular embodiment, each flexible piping comprises an electric cable and/or a pneumatic pipe, the electric cable supplying preferably electrically a defrosting system for the movable flap.

Advantageously, the wing comprises an electric connector rigidly integral with a wall outer face delimiting the accommodating housing, the first end of the flexible piping being electrically connected to the electric connector.

BRIEF DESCRIPTION OF THE DRAWINGS

The present invention will be better understood upon reading the description of exemplary embodiments making reference to the appended drawings in which.

DETAILED DISCLOSURE OF PARTICULAR EMBODIMENTS

Identical, similar or equivalent parts of the different figures bear the same reference numerals so as to facilitate switching from one figure to the other.

Figure 1:
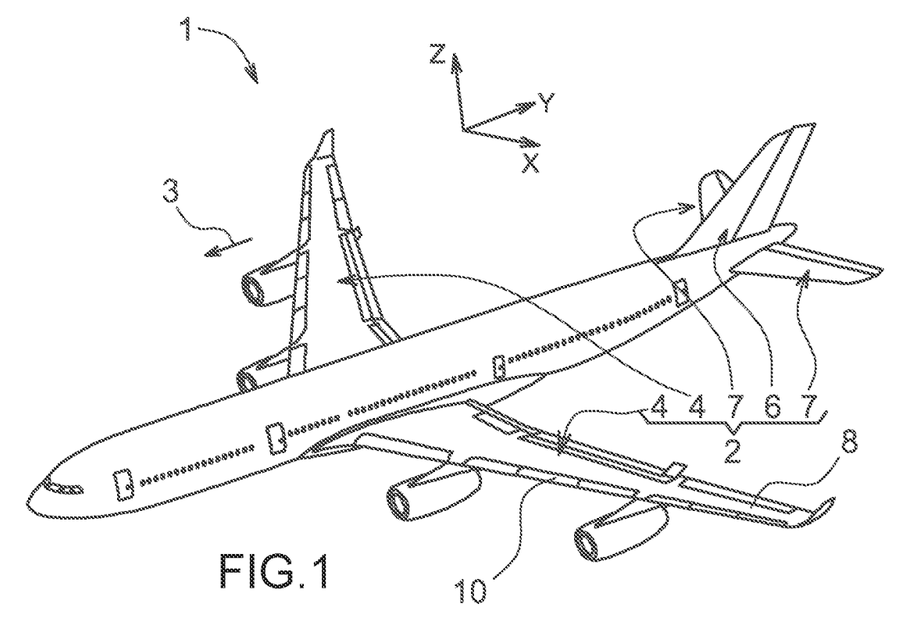
FIG. 1 is a perspective view of an aircraft.

FIG. 1 represents an aircraft 1 having an airfoil 2 consisting of a plurality of airfoil elements, also called aerodynamic lifting surfaces.

Throughout the description that follows, the terms "front" and "rear" are to be considered with respect to a direction of advance of the aircraft, this direction of advance being represented by the arrow 3.

Among the airfoil elements of the aircraft 1, two main wings 4, a vertical stabiliser 6, as well as two horizontal tails 7 located rearwardly of this aircraft are provided.

As regards the wings 4, each of them comprises a wing fixed central body 8 and a leading edge 10.

The fixed central body 8 is also called a main central portion, this body making up substantially the entire wing, and being located rearwardly of the leading edge 10.

Once again, by convention, X-X refers to the leading edge longitudinal direction, or even span direction, Y-Y the direction oriented transversally with respect to the leading edge 10 of the wing 4, and Z-Z the vertical direction, these three directions being orthogonal to each other.

Figure 2:
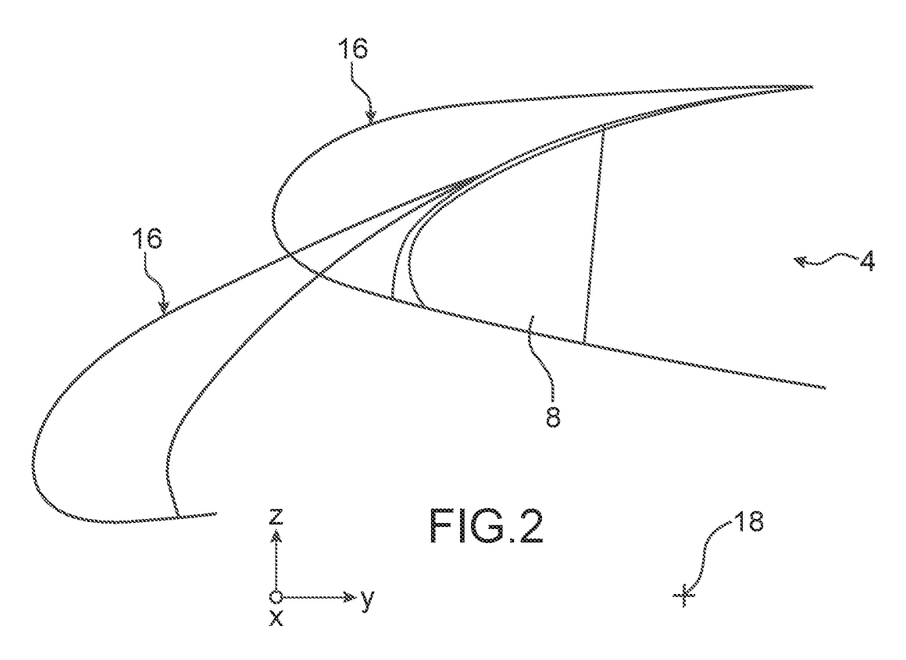
FIG. 2 is a schematic partial cross-section representation of an aircraft wing according to a first embodiment of the invention, provided with a leading edge movable flap.

In reference to FIG. 2, the leading edge 10 of each of the wings 4 is equipped with a leading edge movable flap 16, this movable flap 16 being for being moved relative to the fixed central body 8.

In FIG. 2, the leading edge movable flap 16 is schematically represented in a retracted position in which it snugly fits the front part of the fixed central body 8 of the wing 4. In such a case, the movable flap 16 is in its rearmost position.

In addition, it is also represented in a fully extended position in which it is remote from the fixed central body 8 and forwardly of the fixed central body 8. This fully extended position is adopted in particular during the landing phases in order to increase the low- or medium-speed lift.

The flap 16 is of course configured to be moved between both these end positions, for example such that it assumes an intermediate take-off position, known to those skilled in the art.

By way of indicating purposes, the movable flap 16 extends for example substantially on the entire length of the wing 4 along its span direction X-X or only on one part of the length of the wing 4 along its span direction X-X.

Figure 3:
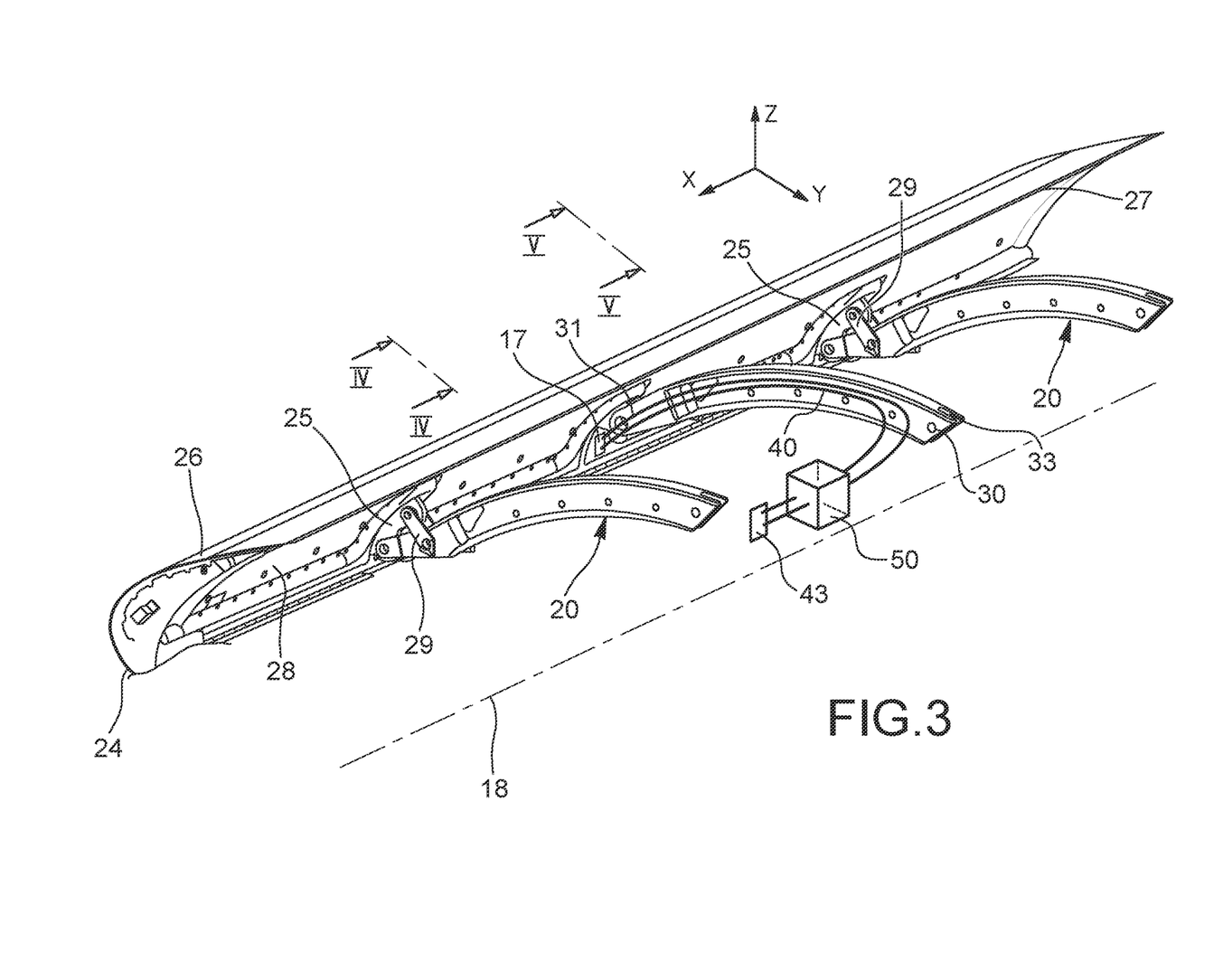
FIG. 3 is a perspective partial representation of the movable flap of the wing according to the first embodiment, in an extended position.

In reference to FIG. 3, the flap 16 includes an aerodynamic coating defining a lower surface portion 24 as well as an upper surface portion 26, the latter terminating with a trailing edge 27 of the flap. The flap 16 is closed rearwardly by a closing coating 28, for snugly fitting the wing fixed body 8 when it occupies the retracted position.

The movable flap 16 contains a defrosting system 17 which requires to be electrically supplied by cables, regardless of whether the flap 16 is in the retracted position or extended position. These cables are joined and fastened together within a flexible piping 40 which extends from the fixed body 8 to the movable flap 16. The flexible piping 40 takes for example the form of a braid of electric cables 43.

FIG. 3 represents a device for moving the leading edge movable flap 16, enabling the latter to be pivoted relative to the body 8, along an axis of rotation 18, between the fully extended position and the retracted position.

The moving device first comprises two driving rails 20 spaced apart from each other along the span direction X-X, both these rails 20 having generally a curved or arc of circle shape, centred on the axis of rotation 18 of the flap.

The front end of each driving rail 20 is connected to the flap 16 by a flap fitting 25 projecting rearwardly from the closing coating 28, an additional rod 29 being arranged between the same fitting 25 and a further rear point of the front end of the rail 20.

The rails 20 are moved relative to the fixed body 8 by an actuation mechanism (not represented) that can assume various shapes known to those skilled in the art. This mechanism includes for example a toothed wheel controlled by a rotary arm with a rack which is parallel to the axis of rotation 18.

The device for moving the flap also includes a follower rail 30 sandwiched between both driving rails 20, preferably at half-distance between the same, in the span direction X-X.

Figures 4, 5:
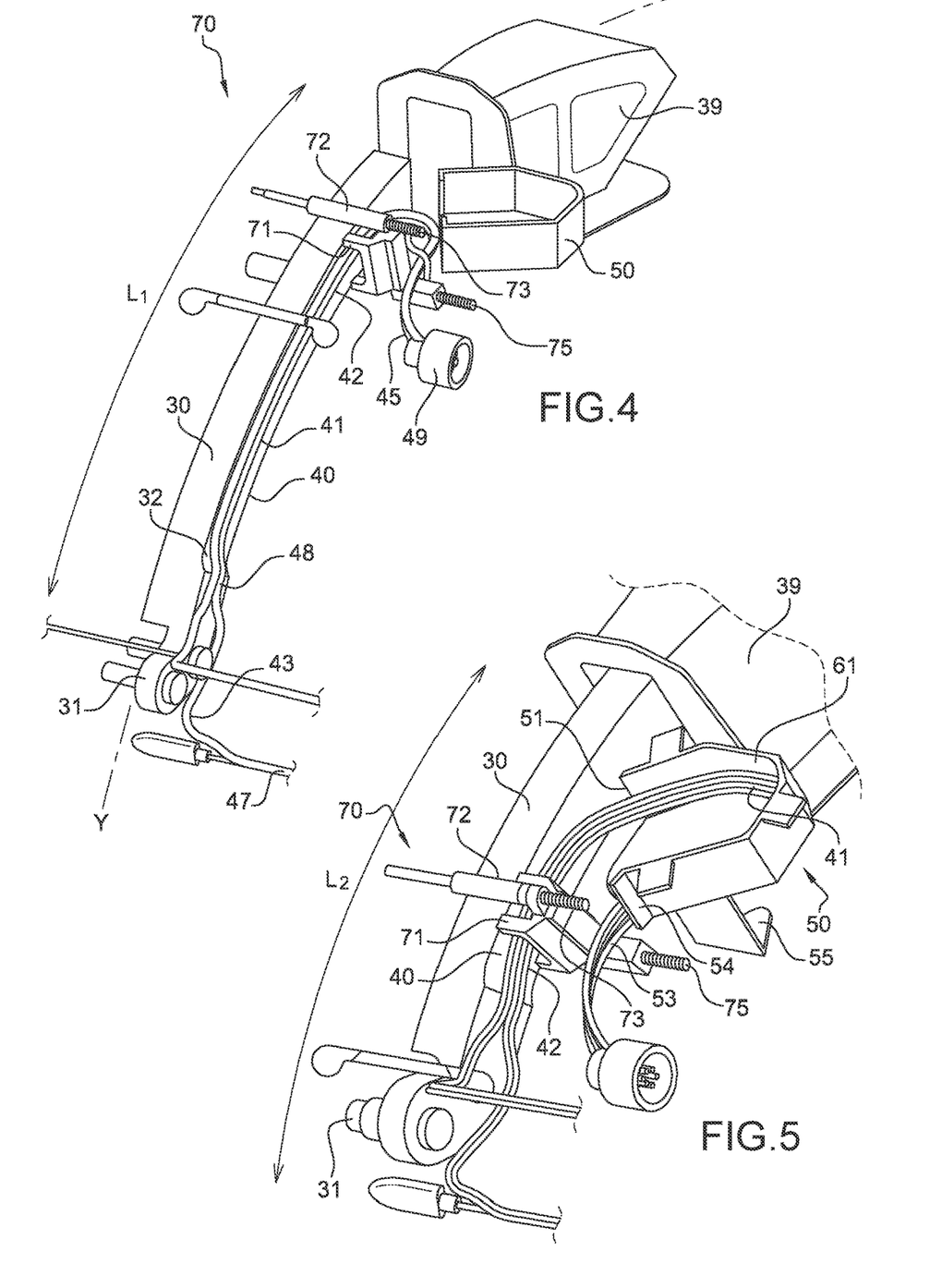
FIG. 4 is a perspective representation of a guide rail for guiding the movable flap and flexible piping of the wing according to the first embodiment, in an extended position.
FIG. 5 is a perspective representation of the guide rail for guiding the wing according to the first embodiment, in a retracted position.

In reference to FIGS. 3 to 5 together, the follower rail 30 has a generally curved or arc of circle shape along its longitudinal direction Y-Y which substantially corresponds to the transverse direction of the wing 4. It extends from a proximal end 33 which is secured to the fixed body 8 and a distal end 31 which is secured to the movable flap 16.

The follower rail 30 is movable between a retracted position and an extended position. It follows the movement of the driving rails 20 relative to the fixed central body 8, by accompanying the movement of the flap 16. Thereby, it forms a guide rail for guiding the movable flap 16 between its retracted position and its extended position.

In the extended position, the rail 30 is located outside a protective box 39 and it is located more forwardly of the aircraft 1 than in the retracted position in which it is partially accommodated in the protective box 39.

In other words, the rail has a curvilinear length $L_1$ outside the protective box 39 in the extended position which is higher than its curvilinear length $L_2$ outside the protective box 39 in the retracted position. The curvilinear length difference $L_1$-$L_2$ of the rail outside the protective box 39 between its retracted position and its extended position is substantially equal to the distance between the extended position of the movable flap 16 and its retracted position.

The rail 30 also enables the amplitude of a slot between the flap trailing edge 27 and the fixed body 8 to be limited, in the extended position of the movable flap 16.

The follower rail 30 carries the flexible piping 40 outside the rail 30. This is in particular pressed against or at least held in the proximity of one of the flanks 32 of the rail 30 by a holding means 70 which will be described in detail hereinafter.

The flexible piping 40 extends between a first end 45 at which it is connected to an electric connector 49 and a second end 47 at which it is fastened to the movable flap 16 to electrically supply the defrosting system 17. The electric connector 49 is for being electrically connected to a complementary connector of the fixed body 8, by being mechanically integral with the fixed body 8.

The flexible piping 40 runs along the rail 30 substantially throughout the length of the rail along its longitudinal direction Y-Y, from the holding means 70 up to the distal end 31 of the rail. The flexible piping 40 extends in the proximity of the transverse median plane of the rail 30. Thereby, the rail 30 plays the role of a guide rail for the piping 40.

The flexible piping 40 is secured to the rail 30, in the proximity of the distal end 31 of the rail, at the securement point 48. It is also held close to the flank 32, in the proximity of its first end 45 by a pusher 71. The flexible piping 40 thereby better runs along the rail 30 that it is substantially pressed against the rail 30, in particular in the proximity of each of the ends 31, 33 of the rail when the rail 30 is in the extended position.

This pusher 71 has generally a jaw shape laterally pierced on either side to let the flexible piping 40 pass along the rail 30. It is for example made of a material comprising polytetrafluoroethylene, also known as Teflon™. The pusher 71 slides along a shank 72 which is itself secured at its first end to the fixed central body 8 and which is free at its second end. This shank 72 extends substantially transversally to the longitudinal direction Y-Y of the rail.

The shank 72 comprises a return spring 73 between the pusher 71 and its second end. The return spring 73 biases the pusher 71 towards the rail 30 such that it holds the flexible piping 40 close enough to the flank 32. Insofar as the spring 73 is offset with respect to the middle of the pusher 71, the pusher 71 is also biased towards the rail 30 by a second spring 75 opposite to the first spring 73 along the pusher 71.

The pusher 71, the shank 72 and the spring 73 are part of the holding means 70 which is carried by the fixed central body 8 at the shank 72.

In reference to FIGS. 3 to 7 together, an accommodating housing 50 is disposed between the first end 45 of the piping and the pusher 71. It is located in the proximity of the flank 32 of the guide rail 30, on the same side of the rail 30 as the flexible piping 40. It is located forwardly of the protective box 39.

Figure 6:
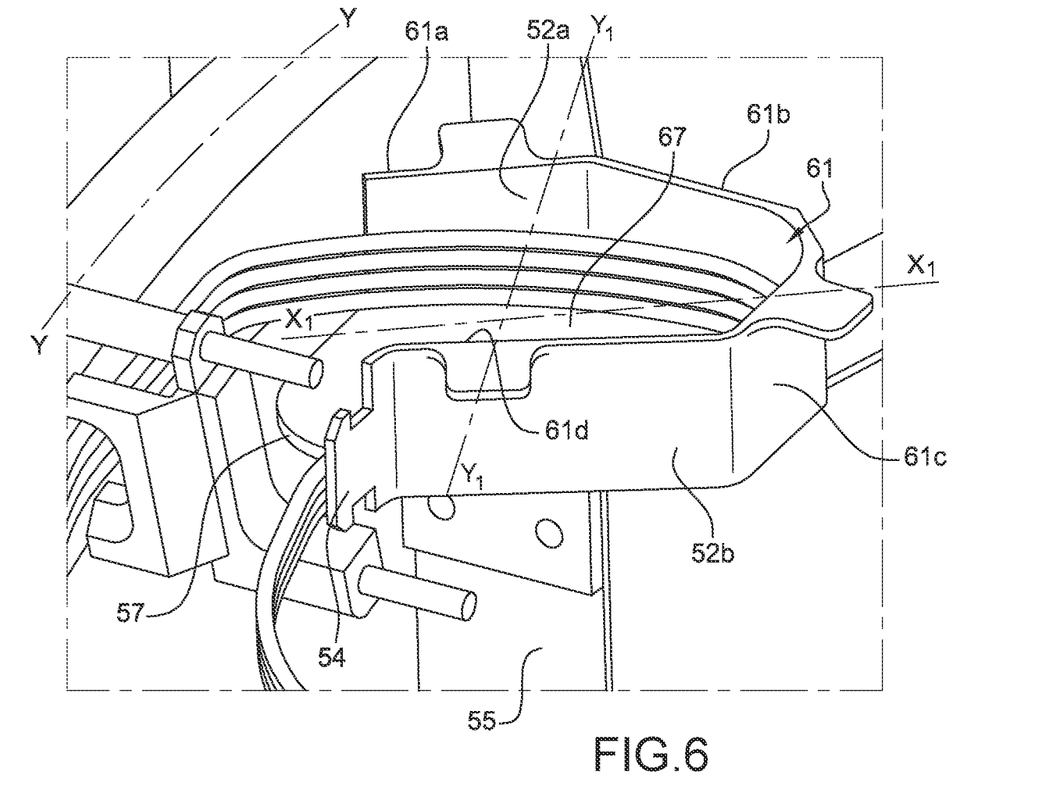
FIGS. 6 and 7 represent an accommodating housing for accommodating the wing piping according to the first embodiment.
Figure 7:
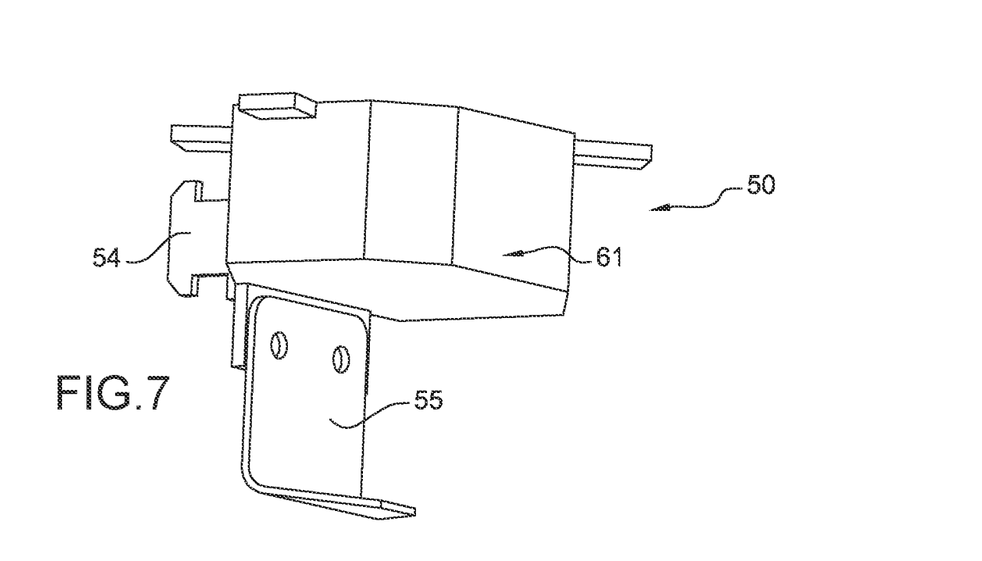

The housing 50 has a polygon shape and it includes a length along its longitudinal direction $X_1$-$X_1$ which is close to its maximum thickness in a transverse direction $Y_1$-$Y_1$ of the housing 50. By way of indicating purposes, the length of the housing 50 along its longitudinal direction $X_1$-$X_1$ is about 10 cm and about 10 cm along its transverse direction $Y_1$-$Y_1$.

The longitudinal direction $X_1$-$X_1$ of the housing 50 is tilted by an angle α the value of which is between 35° and 45° relative to the longitudinal direction Y-Y of the rail. The tilt of the housing 50 relative to the rail 30 enables the housing bulk to be limited along the longitudinal direction Y-Y of the rail. In compensation, the housing 50 is wider along its transverse direction $Y_1$-$Y_1$ than the housing 60 of the second embodiment.

The accommodating housing 50 includes an inlet 51 for the flexible piping 40, an outlet 53 for the flexible piping 40, a wall 61 between the inlet 51 and the outlet 53, as well as a bottom 67 the wall 61 of which is rigidly integral therewith. It also includes a rim 55 to secure the housing 50 to the fixed body 8.

The wall 61 is made as a single piece with the bottom 67. The securement rim 55 is secured to the wall 61.

The wall 61 delimits the housing 50 sideways. It comprises four wall elements 61a, 61b, 61c and 61d being adjacent by two. The first, second and fourth wall elements 61a, 61b and 61d are substantially planar. The third wall element 61c is curved, by including an obtuse angle, which gives the housing 50 a general pentagon shape.

The first wall element 61a is configured to deflect the part of the flexible piping 40 which is located rearward of the pusher 71 along a predetermined direction, to move it closer to the longitudinal direction $X_1$-$X_1$ of the housing.

The wall 61 also comprises a deflector 54 at the outlet 53 of the housing, to deflect the flexible piping 40, such that the flexible piping 40 comes out of the housing with a direction which is substantially parallel to the longitudinal direction Y-Y of the housing 50.

The wall 61 includes an inner face 52a and an outer face 52b opposite to the inner face. The inner 52a and outer 52b faces are substantially parallel to each other. The inner face 52a delimits an inner contour of the housing 50.

Generally, the wall 61 is shaped such that the flexible piping 40 is partially coiled up inside the housing 50, in the retracted position of the rail 30, by being pressed against the inner face 52a of the wall 61.

More specifically, the housing 50 is shaped such that the rail curvilinear length difference $L_1$-$L_2$ outside the protective box 39 is substantially equal to the perimeter length of the inner face 52a of the wall 61. Thereby, the flexible piping 40 makes at most one turn of the wall 61 inside the housing 50, which limits nodes or catching risks for the flexible piping 40 when the rail 30 moves between the retracted position and the extended position and vice versa.

The housing 50 finally includes a barrier 57 between the inlet 51 and the outlet 53 of the housing and which is opposite to the wall 61. The barrier 57 forms a protrusion inside the housing 50, which is used to retain the flexible piping 40, when the rail 30 is in the extended position. It is also intended to restrain in height the flexible piping 40 at the inlet 51 and/or at the outlet 53 of the housing 50.

The extension/retraction movement of the movable flap 16 relative to the fixed body 8 is described in reference to FIGS. 4 and 5 together.

In the extended position of the flap 16, the rail 30 is in the extended position. The flexible piping 40 extends along the rail substantially on the entire length of the rail 30 along its longitudinal direction Y-Y, between the distal end 31 of the rail and the pusher 71.

The portion of the flexible piping 40 between the pusher 71 and the connector 49 passes through the inlet 51 of the housing, runs along the barrier 57, and comes out through the outlet 53, so as to limit at most the length of the piping 40 in the housing 50.

In the retracted position of the flap 16, the rail 30 is in the retracted position. A second portion 42 having a small enough length with respect to the total length of the piping 40 extends along the rail 30 along its longitudinal direction Y-Y, between the distal end 31 of the rail and the pusher 71.

The first portion 41 of the flexible piping 40, which is located between the pusher 71 and the connector 49, passes through the inlet 51 of the housing, runs along the inner face 52a of the wall 61 with which it is in mechanical contact on the entire perimeter of the housing 50, and comes out through the outlet 53 at which it is deflected by the deflector 54.

When the rail 30 switches from its extended position represented in FIG. 4 to its retracted position represented in FIG. 5, part of the flexible piping 40 which ran along the rail 30 is guided inside the housing 50. This first portion 41 of flexible piping is deflected by the first wall element 61a, to gradually snugly fit the entire inner contour of the wall 61 as the rail 30 retracts and the first portion 41 of flexible piping is introduced in the housing 50.

During the entire retraction movement of the rail 30, a portion of flexible piping 40 with a substantially constant length projects from the outlet 53 of the housing up to the connector 49.

When the rail 30 switches from its retracted position represented in FIG. 5 to its extended position represented in FIG. 4, the flexible piping 40 gradually stops running along the inner face 54a of the wall 61 to move closer to the barrier 57, a portion 41 of the flexible piping 40 gradually comes out of the housing through the inlet 51 to accompany the extension of the rail 30.

The retraction/extension movement of the rail 30 modifies the length of flexible piping 40 in the housing 50 but not the length of flexible piping 40 at the outlet 53 of the housing 50 which remains substantially constant.

Figures 8, 9:
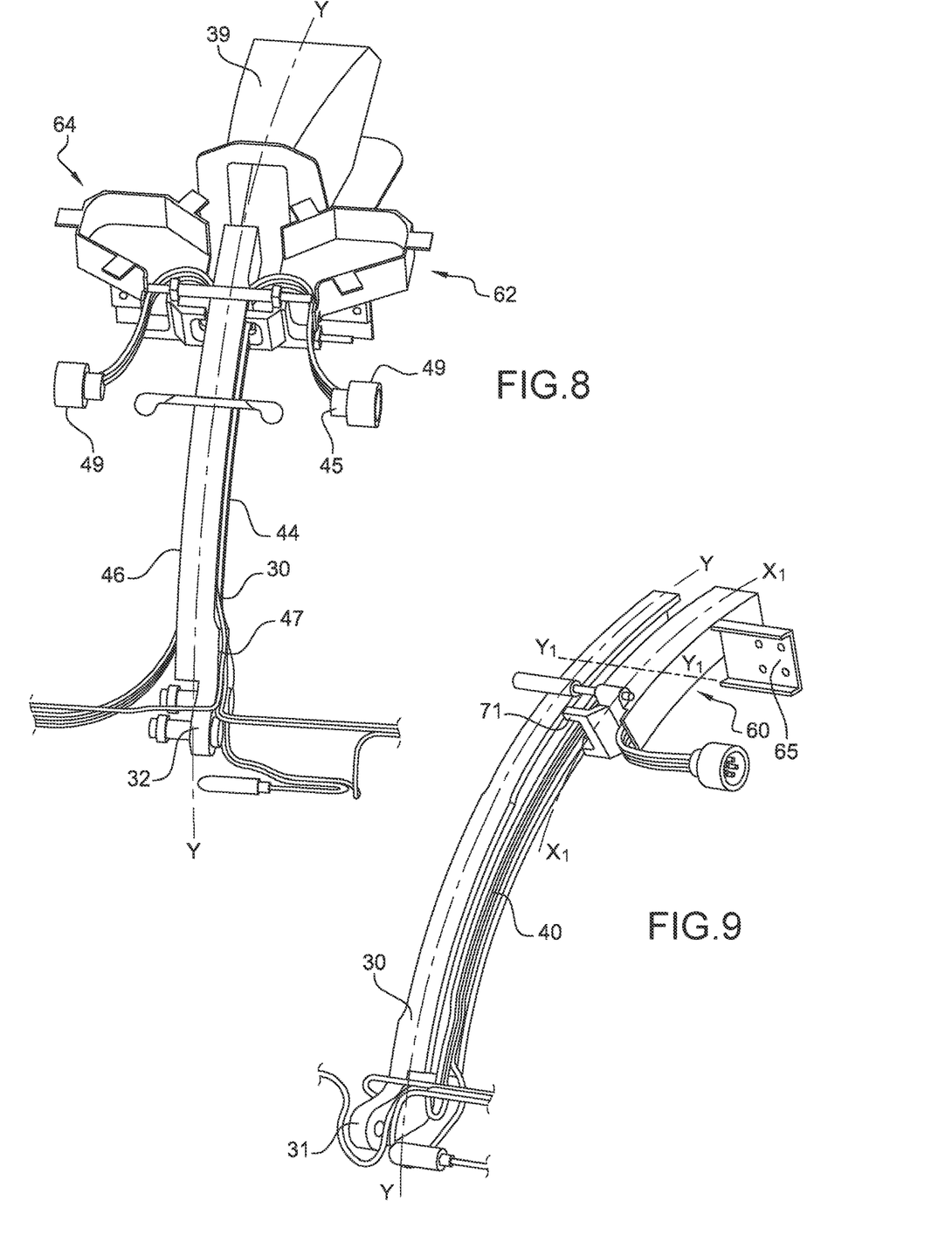
FIG. 8 is a perspective representation of a guide rail for guiding a wing according to a second embodiment.
FIG. 9 is a perspective representation of a guide rail for guiding a wing according to a third embodiment, in an extended position.

The second embodiment, which is represented in FIG. 8, is distinguished from the first embodiment in that it includes two flexible pipings 44, 46 respectively arranged on either side of the rail 30, along one of the rail flanks 32, and two accommodating housings 62, 64 which are each identical to that of the first embodiment described above, to accommodate each of the flexible pipings 44, 46.

The flexible pipings 44, 46 are substantially identical to those of the first embodiment. They are arranged symmetrically by planar symmetry with respect to a median longitudinal sectional plane of the rail 30 which comprises the longitudinal direction Y-Y of the rail 30.

The first housing 62 is oriented substantially identically to the accommodating housing 50 of the first embodiment with respect to the rail 30.

The first housing 62 and the second housing 64 are oriented substantially symmetrically by planar symmetry with respect to the longitudinal sectional plane of the rail 30.

FIG. 9 represents a third embodiment of the invention which is distinguished from the first embodiment by the shape of the housing 60 for accommodating the flexible piping 40.

The housing 60 has a substantially parallelepiped shape and it includes a length along its longitudinal direction $X_1$-$X_1$ which is markedly higher than that of its maximum thickness in a transverse direction $Y_1$-$Y_1$ of the housing 60 with respect to the housing 50 of the first embodiment. By way of indicating purposes, the length of the housing 60 along its longitudinal direction $X_1$-$X_1$ is about 5 cm to 20 cm that of the housing 60 along its transverse direction $Y_1$-$Y_1$.

The longitudinal direction $X_1$-$X_1$ of the housing 60 is parallel to the longitudinal direction Y-Y of the rail 30. Given that the housing 60 is pressed against the flank 32 of the rail and in view of the low thickness of the housing 60, the longitudinal direction $X_1$-$X_1$ of the housing 60 and the longitudinal direction Y-Y of the rail 30 are substantially coaxial.

The lengthening of the housing 60 along the longitudinal direction Y-Y of the rail with respect to that of the first embodiment enables its bulk to be limited along its transverse direction $Y_1$-$Y_1$, that is along the transverse direction of the rail.

The accommodating housing 60 includes an inlet for the flexible piping 40, an outlet for the flexible piping 40, a wall 63 between the inlet and the outlet. The inlet and outlet of the housing 60 are located facing the pusher 71, they are substantially the same, by being only offset from each other along the height of the housing 60. The housing also includes a rim 65 to secure the housing 60 to the fixed body 8.

The wall 63 is made as a single piece. The securement rim 65 is secured to the wall 63.

The wall 63 delimits the housing 60 sideways. It includes four wall elements 63a, 63b, 63c and 63d which are adjacent by two.

Figure 10:
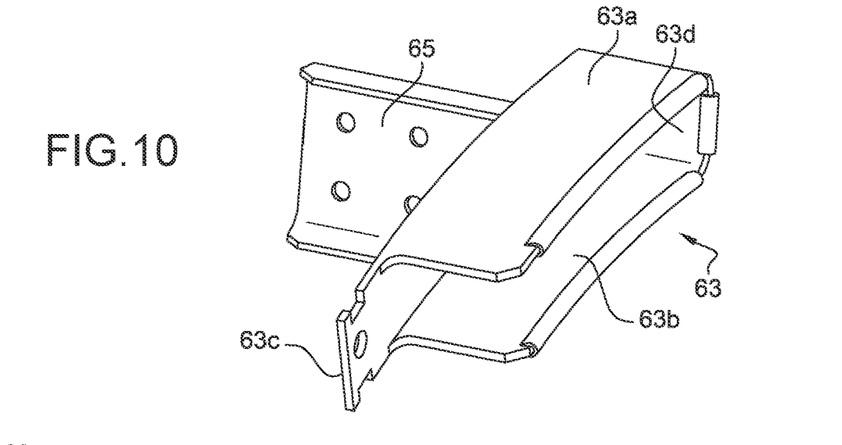
FIG. 10 is a perspective representation of an accommodating housing for accommodating the wing piping according to the third embodiment.

In reference more specifically to FIG. 10, the wall 63 comprises a lower wall element 63a and an upper wall element 63b which are curved and which extend along the longitudinal direction $X_1$-$X_1$ of the housing 60, by being parallel to each other. These two wall elements 63a, 63b are joined by a rear wall element 63d along the transverse direction $Y_1$-$Y_1$ of the housing 60, and by a side wall element 63c which runs along the rail 30. The securement rim 65 projects from the side wall element 63c along the transverse direction $Y_1$-$Y_1$ of the housing 60.

The wall 63 does not include a deflector at the outlet of the housing 60 any longer, since the flexible piping 40 comes in and out of the housing 60 along a direction substantially parallel to the rail longitudinal direction Y-Y, because of the shape and position of the housing 60.

The wall 63 includes an inner face and an outer face opposite to the inner face which delimit an inner contour of the housing 60.

Generally, the wall 63 is shaped such that the flexible piping 40 is partially wound in the housing 60, in the retracted position of the rail 30, by being pressed against the inner face of the wall 63.

More specifically, the housing 60 is shaped such that the rail curvilinear length difference $L_1$-$L_2$ outside the protective box 39 is substantially equal to the perimeter length of the inner face of the wall 63. Thereby, the flexible piping 40 makes at most one turn of the wall 63 inside the housing 60, which limits nodes and catching risks of the flexible piping 40 when the rail 30 is moved between the retracted position and the extended position and vice versa.

The housing 60 does not include a barrier 57 between its inlet and its outlet any longer, because of the shape of the wall 63 of the housing 60.

When the rail 30 switches from its extended position represented in FIG. 9 to its retracted position (not represented), part of the flexible piping 40 which ran along the rail 30 is guided inside the housing 60 along the longitudinal direction $X_1$-$X_1$ of the housing 60. This first portion of flexible piping 40 has a "U" shape in the housing 60 the branches of which extend as the rail 30 is retracted and as the piping 40 moves closer to the rear wall element 63d. The U branches are in mechanical contact with the lower 63a and upper 63b wall elements.

When the rail 30 switches from its retracted position (not represented) to its extended position represented in FIG. 9, the flexible piping 40 moves away from the rear wall element 63d by maintaining a U shape the branches of which are narrowing, while remaining in contact with the lower wall element 63a and the upper wall element 63b. Part of the flexible piping 40 remains in the housing 60, even when the rail 30 is in the extended position.

Figure 11:
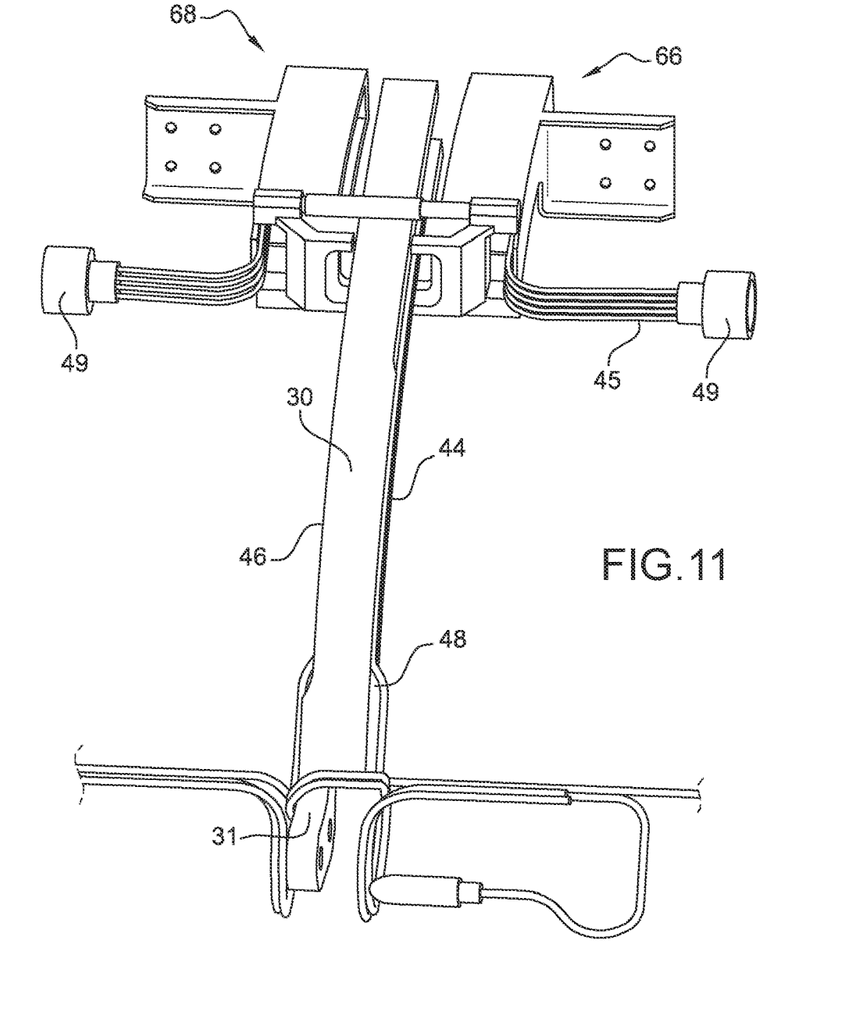
FIG. 11 is a perspective representation of a guide rail for guiding a wing according to a fourth embodiment, in an extended position.

FIG. 11 represents a fourth embodiment of the invention which is distinguished from the third embodiment in that it includes two flexible pipings 44, 46 respectively arranged on either side of the rail 30, along one of the flanks 32 of the rail, and two accommodating housings 66, 68 which are each identical to that of the third embodiment described above, to accommodate each of the flexible pipings 44, 46.

The flexible pipings 44, 46 are substantially identical to those of the first embodiment. They are symmetrically arranged by planar symmetry with respect to a median longitudinal sectional plane of the rail 30 which comprises the longitudinal direction Y-Y of the rail 30.

The first housing 66 is oriented substantially identically to the accommodating housing 60 of the third embodiment with respect to the rail 30.

The first housing 66 and the second housing 68 are oriented substantially symmetrically by planar symmetry with respect to the longitudinal sectional plane of the rail 30.

Each housing 50, 60 and the holding means 70 advantageously enable the flexible piping 40 to accompany the movement of the flap 16, by running along the rail 30 and remaining in the proximity of its flank 32, while protecting it mechanically. In particular, the shape of the housing 50, 60 enables the flexible piping 40 to be suitably wound in the housing, without node to facilitate its subsequent extension by running along the rail 30.

Of course, various modifications could be provided by those skilled in the art to the invention just described.

In particular, the movable flap 16 can be a trailing edge movable flap rather than a leading edge movable flap.

The movable flap 16 is likely to be equipped with pressure sensors 18 which need to be electrically and/or pneumatically connected to the fixed body 8.

Alternatively, the defrosting system 17 is also likely to project hot air along the leading edge of the movable flap 16.

The flexible piping 40 thereby comprises one or more pneumatic pipes.

The piping 40 can run along at least one of the driving rails 20 rather than the follower rail 30, even if it is preferable that it runs along the follower rail 30 which is located in a less bulky environment.

The inlet 51 of the housing 50 can be equipped with a deflector, similar to the deflector 54 at the outlet of the housing described above, to deflect the flexible piping 40 from the longitudinal direction Y-Y of the rail to the inside of the housing 50.

The deflector 54 can also deflect the flexible piping 50 along a tilted direction relative to the longitudinal direction Y-Y of the rail.

What is claimed is:

1. An aircraft wing comprising:
    a fixed central body,
    a movable flap which is located at the periphery of the fixed central body, wherein the movable flap is configured to be rotatably moved relatively to the fixed central body between a retracted position and an extended position,
    a flexible piping comprising a first end connected to the fixed central body and a second end connected to the movable flap,
    a guide rail for guiding the movable flap and the flexible piping, wherein the guide rail is configured to move between a retracted position and an extended position, when the movable flap moves from its retracted position to its extended position,
wherein the wing further comprises:
    an accommodating housing for accommodating the flexible piping, the housing comprising a wall which is shaped such that the flexible piping coils up inside the housing by being pressed against the wall, when the guide rail moves from the extended position to the retracted position, and
    a holding means for holding the flexible piping against or in the proximity of the guide rail, wherein the holding means is carried by the fixed central body, wherein the flexible piping runs externally along the guide rail and wherein the flexible piping is secured to the guide rail in the proximity of the distal end of the rail, wherein the rail is attached to the movable flap at the distal end of the rail, wherein the holding means comprises a pusher which is secured to the fixed central body.

2. The wing according to claim 1, wherein the holding means further comprises a return means biasing the pusher towards the guide rail.

3. The wing according to claim 1, wherein the holding means is closer to the proximal end of the rail than to the distal end of the rail, wherein the holding means is secured to the fixed body at the proximal end of the rail.

4. The wing according to claim 1, wherein the perimeter length of the wall between an inlet of the housing and an outlet of the housing is substantially equal to the length difference of the flexible piping along the guide rail between the retracted position and the extended position of the guide rail.

5. The wing according to claim 1, wherein the housing comprises an inlet which is shaped so as to guide the flexible piping such that the piping comes in the housing along at least one first predetermined direction.

6. The wing according to claim 1, wherein the housing comprises an outlet which is shaped so as to guide the flexible piping such that the piping comes out the housing along at least one second predetermined direction.

7. The wing according to claim 5, wherein the inlet of the housing comprises a deflector configured to deflect the flexible piping along the first predetermined direction relative to the longitudinal direction of the guide rail.

8. The wing according to the claim 6, wherein the outlet of the housing comprises a deflector configured to deflect the flexible piping along the second predetermined direction relative to the longitudinal direction of the guide rail.

9. The wing according to claim 1, wherein the housing extends along a longitudinal direction which is tilted relative to the longitudinal direction of the guide rail.

10. The wing according to claim 1, wherein the housing extends along a longitudinal direction which is substantially parallel to the longitudinal direction of the guide rail.

11. The wing according to claim 1, comprising a second accommodating housing for accommodating a second flexible piping,     wherein the second housing comprises a wall which is shaped such that the second flexible piping coils up inside the housing by being pressed against the wall, when the guide rail moves from its extended position to its retracted position.

12. The wing according to claim 11, wherein both flexible pipings extend along two opposite sides of the guide rail, wherein the accommodating housings are each located at one of the opposite sides of the guide rail.

13. The wing according to claim 1, wherein each flexible piping comprises several cables which are fastened together and/or wherein each flexible piping comprises pipes which are fastened together.

14. The wing according to claim 1, wherein each flexible piping comprises an electric cable and/or a pneumatic pipe.

15. The wing according to claim 14, wherein the electric cable is configured to supply electrically a defrosting system for the movable flap.

16. The wing according to claim 1, comprising an electric connector which is rigidly integral with a wall outer face which delimits the accommodating housing, wherein the first end of the flexible piping is electrically connected to the electric connector.

\* \* \* \* \*